US012761951B2

(12) United States Patent
Kulkarni

(10) Patent No.: US 12,761,951 B2
(45) Date of Patent: Oct. 13, 2026

(54) METHOD AND SYSTEM FOR PROVIDING A PRIORITIZATION RECOMMENDATION FOR A SET OF TASKS

(71) Applicant: JPMorgan Chase Bank, N.A., New York, NY (US)

(72) Inventor: Vinayak Kulkarni, Thane (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 423 days.

(21) Appl. No.: 18/382,795

(22) Filed: Oct. 23, 2023

(65) Prior Publication Data

US 2025/0086006 A1 Mar. 13, 2025

(30) Foreign Application Priority Data

Sep. 9, 2023 (IN) ............................. 202311060729

(51) Int. Cl.
*G06F 9/48* (2006.01)
*G06F 9/50* (2006.01)

(52) U.S. Cl.
CPC .............. *G06F 9/4881* (2013.01); *G06F 9/48* (2013.01); *G06F 9/50* (2013.01); *G06F 9/5005* (2013.01)

(58) Field of Classification Search
CPC . G06F 9/48; G06F 9/4881; G06F 9/50; G06F 9/5005
See application file for complete search history.

(56) References Cited

U.S. PATENT DOCUMENTS 9,286,106 B1 * 3/2016 Huang .................. G06F 9/4881
10,740,286 B1 * 8/2020 Gilderman ............ G06F 9/5038
2015/0113420 A1 * 4/2015 Itani ..................... G06Q 10/109 715/739
2019/0378071 A1 * 12/2019 Xu ................. G06Q 10/063116
2022/0414492 A1 * 12/2022 Jezewski .................. G06N 5/04
2023/0281035 A1 * 9/2023 Robertson ............. G06F 9/5027 718/101

* cited by examiner

*Primary Examiner* — Charles M Swift
(74) *Attorney, Agent, or Firm* — GREENBLUM & BERNSTEIN, P.L.C.

(57) ABSTRACT

A method and a system for providing a task prioritization recommendation for a set of tasks on a set of user devices are disclosed. The method includes: receiving, by a processor, first information related to a failure of the set of tasks; retrieving, by the processor, a set of target parameters related to the failure of the set of tasks; analyzing, by the processor using an artificial intelligence-based module, the first information related to the failure of the set of tasks and the set of target parameters; generating, by the processor, a composite score for the set of tasks based on the analysis; and providing, by the processor on the set of user devices, the task prioritization recommendation based on the composite score.

15 Claims, 4 Drawing Sheets

P69137

METHOD AND SYSTEM FOR PROVIDING A PRIORITIZATION RECOMMENDATION FOR A SET OF TASKS

CROSS-REFERENCE TO RELATED APPLICATIONS

This application claims priority benefit from Indian Application No. 202311060729, filed on Sep. 9, 2023 in the India Patent Office, which is hereby incorporated by reference in its entirety.

BACKGROUND

Field of the Disclosure

This technology generally relates to data analysis, and more particularly to methods and systems for providing a prioritization recommendation for a set of tasks on a set of user devices.

Background Information

The following description of the related art is intended to provide background information pertaining to the field of the present disclosure. This section may include certain aspects of the art that may be related to various features of the present disclosure. However, it should be appreciated that this section is used only to enhance the understanding of the reader with respect to the present disclosure, and not as an admission of the prior art.

Over a period of time, digital technologies have been enhanced to a greater extent such that it is now possible for users of electronic devices to seamlessly execute various day-to-day tasks using their electronic devices. Mainly, over past few years a number of technologies have been developed, leading to development of various digital platforms such as, for example, digital applications or digital websites that may be accessed on smart electronic devices to performs certain tasks. For example, processing a trade digitally is such a task that can be easily performed on smart electronic devices such as a smartphone via a dedicated application installed on such smartphone.

To execute certain tasks, several factors are considered that are responsible for a successful execution or failure of such tasks. These factors are required to be monitored and analyzed efficiently, as failure of a task may result in various losses. For example, trades may fail in settlement due to multiple factors such as due to reasons like wrong settlement instructions, no pre-matching, low quality data, etc. A failed transaction or trade may have impact on variety of areas from security lending cost, penalties, risk exposure, and others.

The currently existing technologies provide various solutions to analyze the factors that are responsible for successful execution or failure of the tasks, to further ensure a successful execution of the tasks. However, there are certain limitations of these solutions, such as the fact that these solutions typically rely upon manual intervention and therefore are not efficient in events where it is required to analyze a larger dataset related to the factors responsible for the successful execution or the failure of the tasks.

Additionally, in the existing state of art for any digital platform, users are unable to use data meaningfully due to lack of guiding structure which may help in prioritization and classification of task fails, providing probability of task execution and guidance in terms of actionable instructions to address the task failure and get the task settled. For example, in the existing state of art for a digital payment application or for a digital payment website, back office and middle office users are unable to use data meaningfully due to lack of guiding structure which may help in prioritization and classification of trade fails, providing probability of trade settlement and guidance in terms of actionable instructions to address the trade failure and get the trade settled.

It is important to handle failure of important tasks e.g., tasks that are having a larger monetary or larger risk impact than others, however the existing solutions fail to provide a task management and task prioritization solution that can efficiently handle task failures and improve key performance indicators (KPIs).

Accordingly, in view of the above-mentioned and other existing limitations, there exists a need to provide an efficient solution to overcome the limitations of the existing arts, and to develop a method and a system for providing a prioritization recommendation for a set of tasks on a set of user devices.

SUMMARY

The present disclosure, through one or more of its various aspects, embodiments, and/or specific features or sub-components, provides, inter alia, various systems, servers, devices, methods, media, programs, and platforms for providing a prioritization recommendation for a set of tasks on a set of user devices.

According to an aspect of the present disclosure, a method for providing a task prioritization recommendation for a set of tasks on a set of user devices is disclosed. The method may include: receiving, by the at least one processor via a communication interface, first information related to a failure of the set of tasks, from a set of task settlement platforms; retrieving, by the at least one processor from a memory, a set of target parameters related to the failure of the set of tasks; analyzing, by the at least one processor using an artificial intelligence-based module, the first information related to the failure of the set of tasks and the set of target parameters; generating, by the at least one processor, a composite score for the set of tasks based on the analysis of the first information related to the failure of the set of tasks and the set of target parameters; and providing, by the at least one processor on the set of user devices, the task prioritization recommendation for the set of tasks based on the composite score for the set of tasks.

In accordance with an exemplary embodiment, the first information related to the failure of the set of tasks and the set of target parameters are further analyzed by the at least one processor based on a manual input; and the first information related to the failure of the set of tasks may include at least one from among a first risk detail related to a value associated with the failure of the set of tasks, a first urgency detail related to the value associated with the failure of the set of tasks, a first complexity detail related to the value associated with the failure of the set of tasks, a first cost detail related to the value associated with the failure of the set of tasks, a second risk detail related to a flag associated with the failure of the set of tasks, a second urgency detail related to the flag associated with the failure of the set of tasks, a second complexity detail related to the flag associated with the failure of the set of tasks, and a second cost detail related to the flag associated with the failure of the set of tasks.

In accordance with an exemplary embodiment, the analyzing of the first information related to the failure of the set of tasks and the set of target parameters may include: assigning a respective weight to each respective target parameter included in the set of target parameters based on at least one from among a set of market conditions and the first information related to the failure of the set of tasks; assigning a respective priority value to said each respective target parameter included in the set of target parameters based on the respective weight assigned to said each respective target parameter included in the set of target parameters; and determining a respective score factor for said each respective target parameter included in the set of target parameters based on the respective priority value of said each respective target parameter included in the set of target parameters.

In accordance with an exemplary embodiment, the generating of the composite score for the set of tasks may include generating the composite score for the set of tasks based on the respective score factor for said each respective target parameter included in the set of target parameters.

In accordance with an exemplary embodiment, at least one task from among the set of tasks is a trade settlement task, and the set of target parameters related to the failure of the set of tasks is identified from a set of pre-defined parameters based on the set of market conditions.

In accordance with an exemplary embodiment, the method may further include: receiving, by the at least one processor, at least one from among: a set of feedback data from the set of user devices based on the task prioritization recommendation provided on the set of user devices for the set of tasks, and a set of additional target parameters based on the set of market conditions; updating, by the at least one processor, the artificial intelligence-based module based on at least one from among the set of feedback data and the set of additional target parameters; reanalyzing, by the at least one processor, the first information related to the failure of the set of tasks and the set of target parameters, using the updated artificial intelligence-based module, to generate an updated composite score for the set of tasks; and providing, by the at least one processor on the set of user devices, an updated version of the task prioritization recommendation for the set of tasks based on the updated composite score for the set of tasks.

According to another aspect of the present disclosure, a computing device configured to provide a task prioritization recommendation for a set of tasks on a set of user devices, is disclosed. The computing device may include a processor, a memory, and a communication interface coupled to each of the processor and the memory. The processor may be configured to: receive, via the communication interface, first information related to a failure of the set of tasks, from a set of task settlement platforms; retrieve, from the memory, a set of target parameters related to the failure of the set of tasks; analyze, using an artificial intelligence-based module, the first information related to the failure of the set of tasks and the set of target parameters; generate a composite score for the set of tasks based on the analysis of the first information related to the failure of the set of tasks and the set of target parameters; and provide, on the set of user devices, the task prioritization recommendation for the set of tasks based on the composite score for the set of tasks.

In accordance with an exemplary embodiment, the first information related to the failure of the set of tasks and the set of target parameters are further analyzed by the at least one processor based on a manual input; and the first information related to the failure of the set of tasks may include at least one from among a first risk detail related to a value associated with the failure of the set of tasks, a first urgency detail related to the value associated with the failure of the set of tasks, a first complexity detail related to the value associated with the failure of the set of tasks, a first cost detail related to the value associated with the failure of the set of tasks, a second risk detail related to a flag associated with the failure of the set of tasks, a second urgency detail related to the flag associated with the failure of the set of tasks, a second complexity detail related to the flag associated with the failure of the set of tasks, and a second cost detail related to the flag associated with the failure of the set of tasks.

In accordance with an exemplary embodiment, to analyze the first information related to the failure of the set of tasks and the set of target parameters, the processor may be further configured to: assign a respective weight to each respective target parameter included in the set of target parameters based on at least one from among a set of market conditions and the first information related to the failure of the set of tasks; assign a respective priority value to said each respective target parameter included in the set of target parameters based on the respective weight assigned to said each respective target parameter included in the set of target parameters; and determine a respective score factor for said each respective target parameter included in the set of target parameters based on the respective priority value of said each respective target parameter included in the set of target parameters.

In accordance with an exemplary embodiment, the processor may be further configured to generate the composite score for the set of tasks based on the respective score factor for said each respective target parameter included in the set of target parameters.

In accordance with an exemplary embodiment, at least one task from among the set of tasks is a trade settlement task, and the set of target parameters related to the failure of the set of tasks is identified from a set of pre-defined parameters based on the set of market conditions.

In accordance with an exemplary embodiment, the processor may be further configured to: receive at least one from among: a set of feedback data from the set of user devices based on the task prioritization recommendation provided on the set of user devices for the set of tasks, and a set of additional target parameters based on the set of market conditions; update the artificial intelligence-based module based on at least one from among the set of feedback data and the set of additional target parameters; reanalyze the first information related to the failure of the set of tasks and the set of target parameters, using the updated artificial intelligence-based module, to generate an updated composite score for the set of tasks; and provide, on the set of user devices, an updated version of the task prioritization recommendation for the set of tasks based on the updated composite score for the set of tasks.

According to yet another aspect of the present disclosure, a non-transitory computer readable storage medium storing instructions for providing a task prioritization recommendation for a set of tasks on a set of user devices, is disclosed. The instructions include executable code which, when executed by a processor, may cause the processor to: receive, via a communication interface, first information related to a failure of the set of tasks, from a set of task settlement platforms; retrieve, from the memory, a set of target parameters related to the failure of the set of tasks; analyze, using an artificial intelligence-based module, the first information related to the failure of the set of tasks and the set of target parameters; generate a composite score for the set of tasks based on the analysis of the first information related to the failure of the set of tasks and the set of target parameters; and provide, on the set of user devices, the task prioritization recommendation for the set of tasks based on the composite score for the set of tasks.

In accordance with an exemplary embodiment, the first information related to the failure of the set of tasks may include at least one from among a first risk detail related to a value associated with the failure of the set of tasks, a first urgency detail related to the value associated with the failure of the set of tasks, a first complexity detail related to the value associated with the failure of the set of tasks, a first cost detail related to the value associated with the failure of the set of tasks, a second risk detail related to a flag associated with the failure of the set of tasks, a second urgency detail related to the flag associated with the failure of the set of tasks, a second complexity detail related to the flag associated with the failure of the set of tasks, and a second cost detail related to the flag associated with the failure of the set of tasks.

In accordance with an exemplary embodiment, when executed by the processor, the executable code may further cause the processor to analyze the first information related to the failure of the set of tasks and the set of target parameters based on a manual input.

In accordance with an exemplary embodiment, to analyze the first information related to the failure of the set of tasks and the set of target parameters, when executed by the processor, the executable code may further cause the processor to: assign a respective weight to each respective target parameter included in the set of target parameters based on at least one from among a set of market conditions and the information related to the failure of the set of tasks; assign a respective priority value to said each respective target parameter included in the set of target parameters based on the respective weight assigned to said each respective target parameter included in the set of target parameters; and determine a respective score factor for said each respective target parameter included in the set of target parameters based on the respective priority value of said each respective target parameter included in the set of target parameters.

In accordance with an exemplary embodiment, when executed by the processor, the executable code may further cause the processor to generate the composite score for the set of tasks based on the respective score factor for said each respective target parameter included in the set of target parameters.

In accordance with an exemplary embodiment, at least one task from among the set of tasks is a trade settlement task, and the set of target parameters related to the failure of the set of tasks is identified from a set of pre-defined parameters based on the set of market conditions.

In accordance with an exemplary embodiment, when executed by the processor, the executable code may further cause the processor to: receive at least one from among: a set of feedback data from the set of user devices based on the task prioritization recommendation provided on the set of user devices for the set of tasks, and a set of additional target parameters based on the set of market conditions; update the artificial intelligence-based module based on at least one from among the set of feedback data and the set of additional target parameters; reanalyze the first information related to the failure of the set of tasks and the set of target parameters, using the updated artificial intelligence-based module, to generate an updated composite score for the set of tasks; and provide, on the set of user devices, an updated version of the task prioritization recommendation for the set of tasks based on the updated composite score for the set of tasks.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

DETAILED DESCRIPTION

Figure 1:
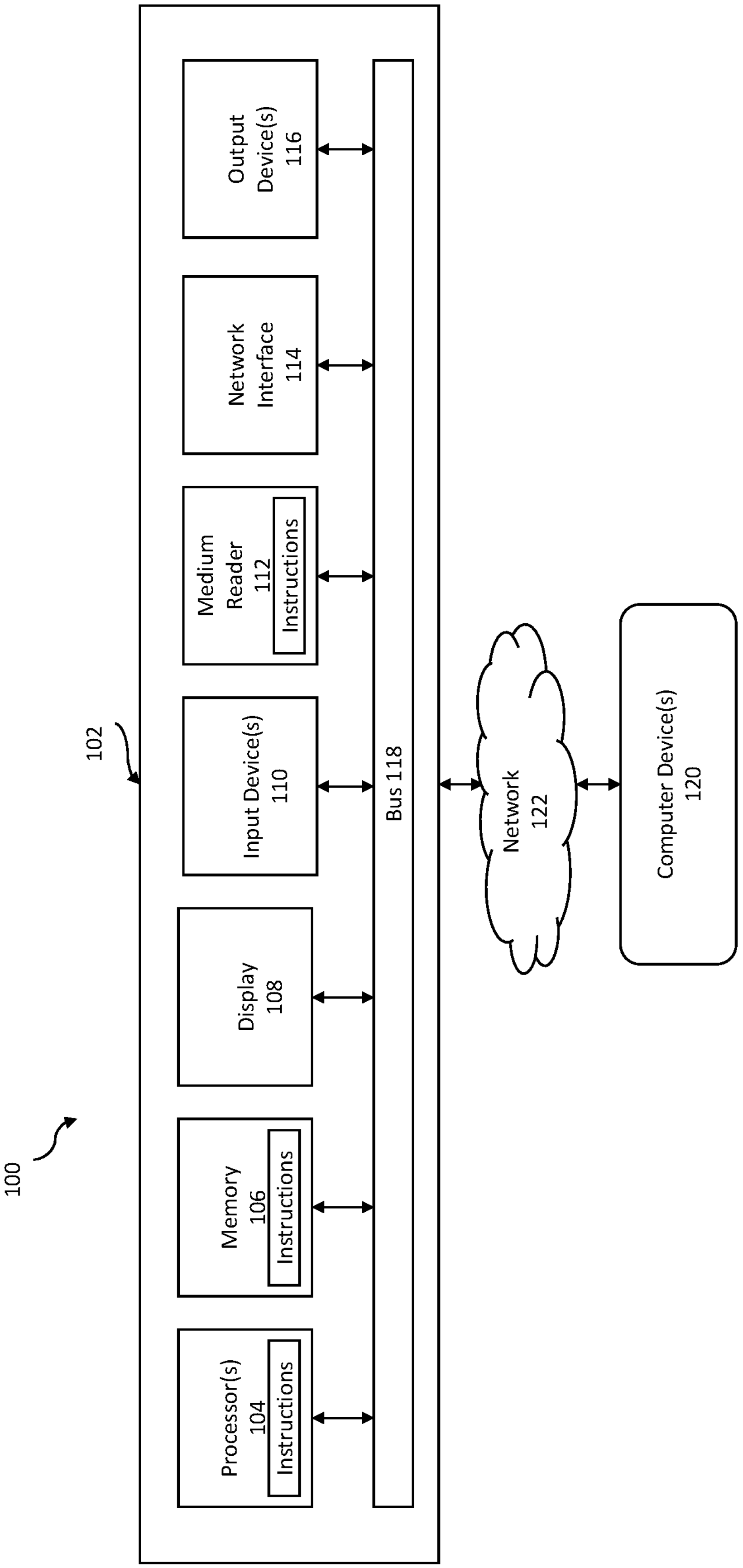
FIG. 1 illustrates an exemplary diagram of a computer system for providing a prioritization recommendation for a set of tasks on a set of user devices, in accordance with an exemplary embodiment.

Exemplary embodiments now will be described with reference to the accompanying drawings. The exemplary embodiments may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to “an”, “one” or “some” embodiment(s) in several locations. This does not necessarily imply that each such reference is to the same embodiment (s), or that the feature only applies to a single embodiment. Single features of different embodiments may also be combined to provide other embodiments.

As used herein, the singular forms “a”, “an” and “the” are intended to include the plural forms as well, unless expressly stated otherwise. It will be further understood that the terms “include”, “comprises”, “including” and/or “comprising” when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being “connected” or “coupled” to another element, it can be directly connected or coupled to the other element or intervening elements may be present. Furthermore, “connected”

or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases or terms can be used interchangeably. Furthermore, as used herein, the phrase "set of" means and includes "one or more" and such phrases or terms can be used interchangeably.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units and/or controllers described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the invention. It will be apparent however, that the invention may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer readable storage medium having instructions stored thereon for one or more aspects of the present technology as described and illustrated by way of the examples herein. The instructions in some examples include executable code that, when executed by one or more processors, causes the processors to carry out steps necessary to implement the methods of the examples of this technology that are described and illustrated herein.

To overcome problems associated with existing solutions developed for handling failure of tasks, the present disclosure provides a method and a system for providing a prioritization recommendation for a set of tasks on a set of user devices. To provide said prioritization recommendation on the set of user devices initially the system analyzes an information related to a failure of the set of tasks and a set of target parameters related to the failure of the set of tasks, using an artificial intelligence-based module. Thereafter, based on the analysis, the system generates a composite score for the set of tasks, to provide on the set of user devices the task prioritization recommendation for the set of tasks based on the composite score. In an exemplary implementation, the system also updates the artificial intelligence-based module based on at least one among a set of feedback data related to the task prioritization recommendation and a set of additional target parameters related to the failure of the set of tasks. The set of additional target parameters includes one or more new parameters that are related to the failure of the set of tasks in addition to the set of target parameters related to the failure of the set of tasks. The system then utilizes the updated artificial intelligence-based module to generate an updated composite score for the set of tasks and then the system provides an enhanced task prioritization recommendation for the set of tasks based on the updated composite score. In a preferred implementation, at least one from among the set of tasks is a trade settlement task and the set of target parameters related to the failure of the set of tasks is identified from a set of pre-defined parameters based on a set of market conditions. Also, in the preferred implementation, the set of additional target parameters related to the failure of the set of tasks are also identified from the set of pre-defined parameters based on the set of market conditions.

Particularly, in the preferred implementation, the system overcomes limitations related to handling of trade failure(s) during trade settlement task(s). The system provides a guiding structure to help in prioritization and classification of trade fails, providing probability of trade settlement and guidance in terms of actionable instructions to address the trade failure(s) and get the trade failure(s) settled. The system for a trade settlement task generates a composite score based on an analysis of common reasons for trade failure(s) and major impact factors, wherein the analysis is based on current market conditions. Further, prioritization recommendation(s) generated and provided based on said composite score used as a guiding stick for users of the set of user devices which help the users in navigating through data over-load.

Therefore, the present disclosure provides a technical solution of providing a prioritization recommendation for a set of tasks on a set of user devices. Also, the present disclosure provides the technical solution that overcomes the limitations of the existing solutions such as including but is not limited to requirements of human resources at a large scale and manual errors while handling various tasks simultaneously. Moreover, the technical solution as disclosed in the present disclosure provides technical effect and technical advantage over the existing solutions as the technical solution encompasses 1) generating a composite score that ranks task failures, and used to generate and provide prioritization recommendation(s) on user device(s) to guide users of the user device(s) in prioritizing important tasks, 2) generating an improved composite score based on a set of feedback data and additional parameters related to task failure(s), 3) generating a composite score as a single index score having multiple underlying components directly linked with risk and cost associated with task failure(s), 4) handling task fails related to important tasks, e.g., tasks having at least one among a large monetary impact and a large risk impact than others, and 5) handling task fails in more enhanced manner, thus improving the key performance indicators (KPIs), etc.

FIG. 1 depicts an exemplary system 100 for use in accordance with the embodiments described herein. The system 100 as depicted in FIG. 1 is generally shown and may include a computer system 102, which is generally indicated. The term "computer system" may also be referred to as "computing device" and such phrases/terms can be used interchangeably in the specifications.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud-based environment. Even further, the instructions may be operative in a such cloud-based computing environment.

In a networked deployment, the computer system 102 may operate in the capacity of a server or as a client-user computer in a server-client user network environment, a client-user computer in a cloud-based computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smartphone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application-specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read-only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, and unsecure and/or unencrypted. As regards the present disclosure, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but is not limited to, a network interface 114 and an output device 116. The output device 116 may be, but is not limited to, a speaker, an audio out, a video out, a remote-control output, a printer, or any combination thereof. Additionally, the term "Network interface" may also be referred to as "Communication interface" and such phrases/terms can be used interchangeably in the specification.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but is not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near-field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer (PC). However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide prioritization recommendation for a set of tasks on a set of user devices.

Figure 2:
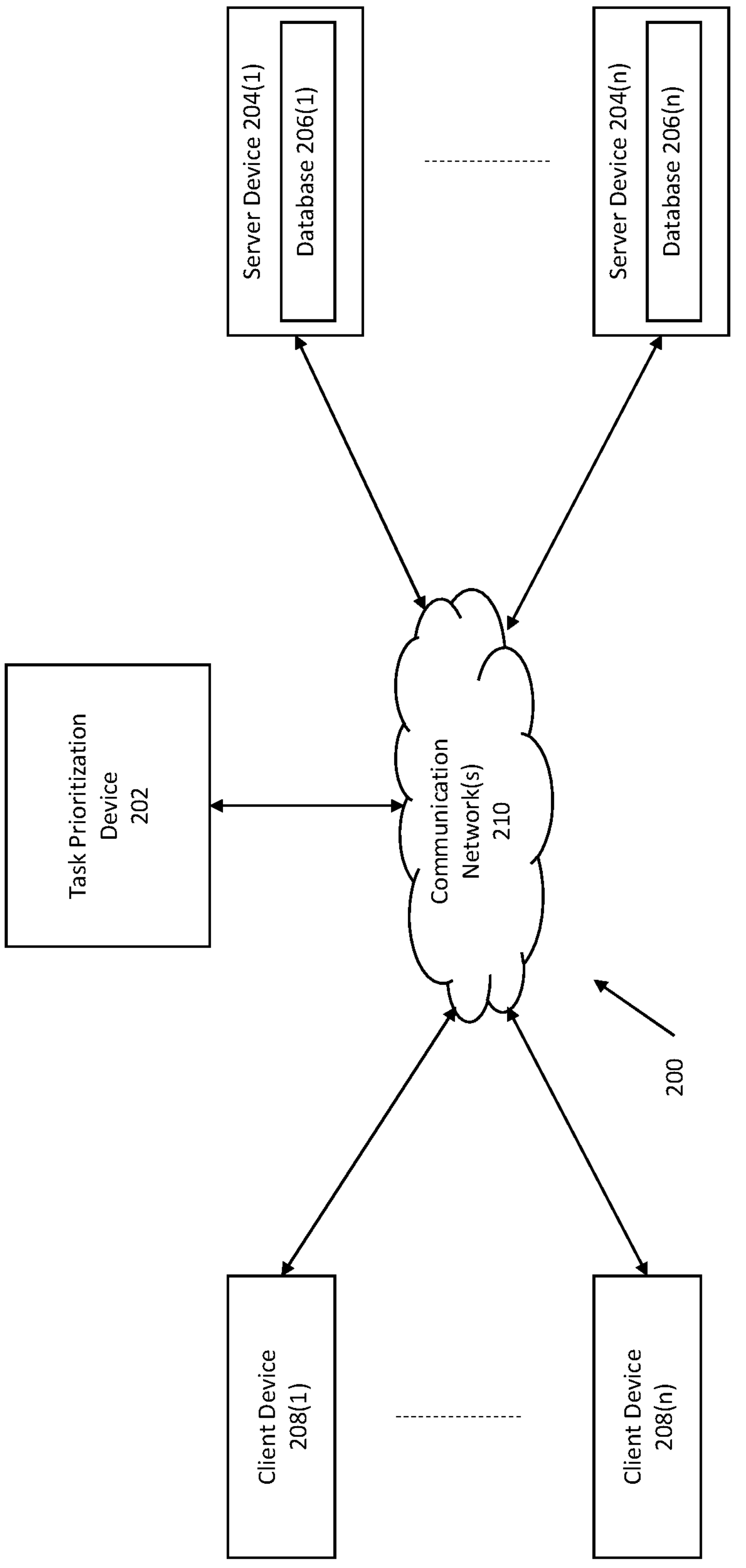
FIG. 2 illustrates an exemplary diagram of a network environment for providing a prioritization recommendation for a set of tasks on a set of user devices, in accordance with an exemplary embodiment.

Referring to FIG. 2, a schematic of an exemplary network environment 200 for implementing a method for providing prioritization recommendation for a set of tasks on a set of user devices is illustrated. In an exemplary embodiment, the method is executable on any networked computer platform, such as, for example, a personal computer (PC).

The method for providing the prioritization recommendation for the set of tasks on the set of user devices may be implemented by a Task Prioritization (TP) device 202. The TP device 202 may be the same or similar to the computer system 102 as described with respect to FIG. 1. The TP device 202 may store one or more applications that can include executable instructions that, when executed by the TP device 202, cause the TP device 202 to perform desired actions, such as to transmit, receive, or otherwise process network messages, for example, and to perform other actions described and illustrated below with reference to the figures. The application(s) may be implemented as modules or components of other applications. Further, the application (s) may be implemented as operating system extensions, modules, plugins, or the like.

Even further, the application(s) may be operative in a cloud-based computing environment. The application(s) may be executed within or as a virtual machine(s) or virtual server(s), that may be managed in a cloud-based computing environment. Also, the application(s), and even the TP device 202 itself, may be located in the virtual server(s) running in a cloud-based computing environment rather than being tied to one or more specific physical network computing devices. Also, the application(s) may be running in one or more virtual machines (VMs) executing on the TP device 202. Additionally, in one or more embodiments of this technology, the virtual machine(s) running on the TP device 202 may be managed or supervised by a hypervisor.

In the network environment 200 of FIG. 2, the TP device 202 is coupled to a plurality of server devices **204(1)-204(*n*) that hosts a plurality of databases or repositories 206(1)-206(*n*), and also to a plurality of client devices 208(1)-208(*n*) via communication network(s) 210. A communication interface of the TP device 202, such as the network interface 114 of the computer system 102 of FIG. 1, operatively couples and communicates between the TP device 202, the server devices 204(1)-204(*n*), and/or the client devices 208(1)-208(*n*), which are all coupled together by the communication network(s) 210**, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TP device 202, the server devices **204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein. This technology provides a number of advantages including methods, non-transitory computer-readable storage media, and TP devices 202 that efficiently implement a method for providing a prioritization recommendation for a set of tasks on a set of user devices, the method being implemented by at least one processor 104**.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Networks (PSTNs), Ethernet-based Packet Data Networks (PDNs), combinations thereof, and the like.

The TP device 202 may be a standalone device or integrated with one or more other devices or apparatuses, such as one or more of the server devices 204(1)-204(*n*), for example. In one particular example, the TP device 202 may include or be hosted by one of the server devices 204(1)-204(*n*), and other arrangements are also possible. Moreover, one or more of the devices of the TP device 202 may be in a same or a different communication network including one or more public, private, or cloud-based networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. In an example, the server devices 204(1)-204(*n*) may process requests received from the TP device 202 via the communication network(s) 210 according to Hypertext Transfer Protocol (HTTP)-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) host the databases or repositories 206(1)-206(*n*) that are configured to store data that relates to at least one among: 1) information related to a failure of the set of tasks, 2) a set of pre-defined parameters related to the failure of the set of tasks, and 3) a set of market conditions.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a controller/agent approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to-peer architecture, virtual machines, or within a cloud-based architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the TP device 202 via the communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, e.g., a smartphone.

The client devices 208(1)-208(*n*) may run interface applications, such as standard web browsers or standalone client applications, which may provide an interface to communicate with the TP device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the TP device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TP device 202, the server devices 204(1)-204(*n*), or the client devices 208(1)-208(*n*), for example, may be configured to operate as virtual instances on the same physical machine. In other words, one or more of the TP device 202, the server devices 204(1)-204(*n*), or the client devices 208(1)-208(*n*) may operate on the same physical device rather than as separate devices communicating through a communication network(s) 210. Additionally, there may be more or fewer TP devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
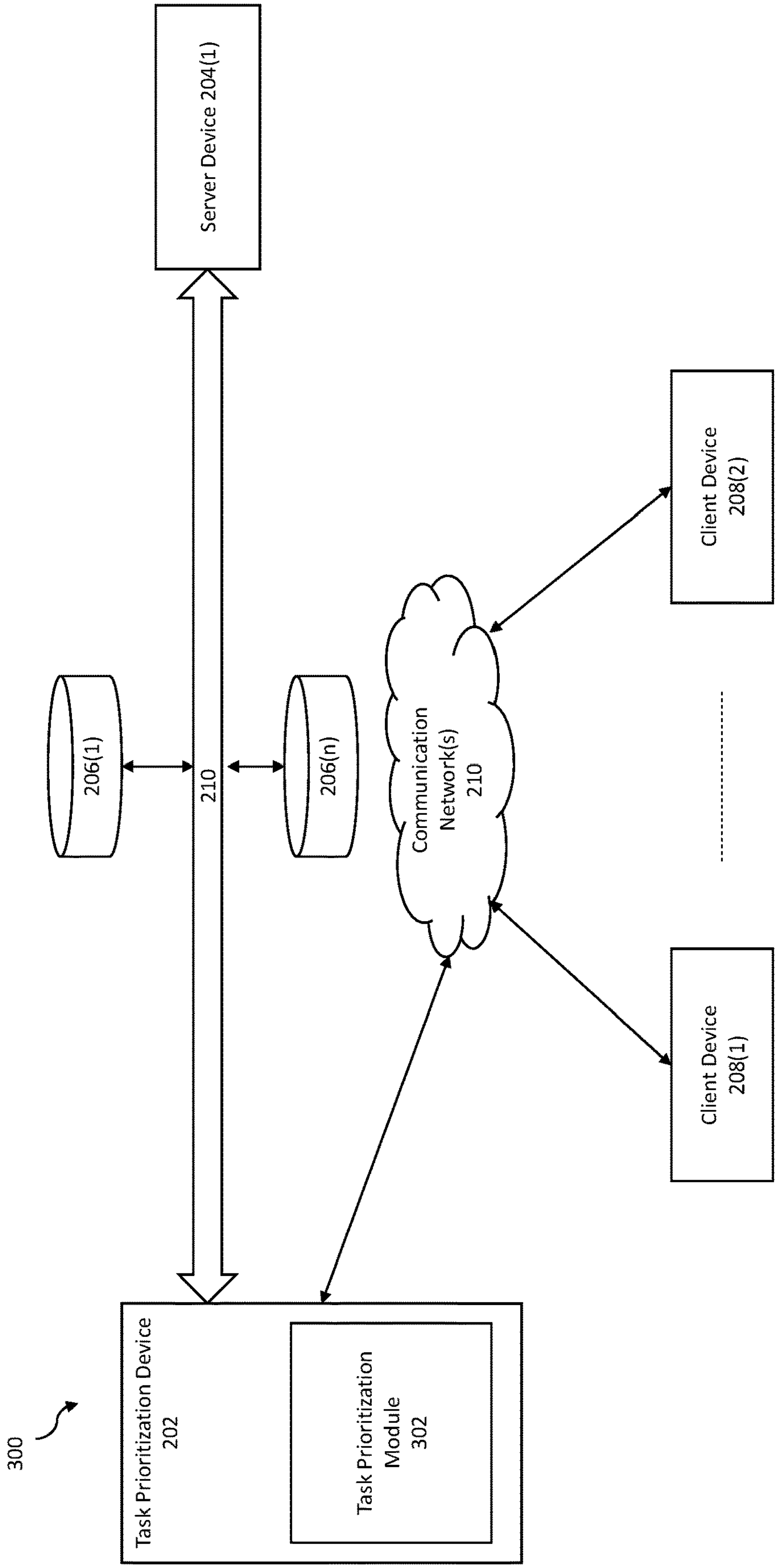
FIG. 3 illustrates an exemplary diagram of a system for implementing a method for providing a prioritization recommendation for a set of tasks on a set of user devices, in accordance with an exemplary embodiment.

FIG. 3 illustrates an exemplary system for implementing a method for providing a prioritization recommendation for a set of tasks on a set of user devices, in accordance with an exemplary embodiment. As illustrated in FIG. 3, according to exemplary embodiments, the system 300 may comprise an TP device 202 including a Task Prioritization (TP) module 302 that may be connected to a server device 204(1) and one or more repository from the repositories 206(1) . . . 206(*n*) via a communication network 210, but the present disclosure is not limited thereto.

The TP device 202 is described and shown in FIG. 3 as including the TP module 302, although it may include other rules, policies, modules, databases, or applications, for example. As will be described below, the TP module 302 is configured to implement a method for providing a prioritization recommendation for a set of tasks on a set of user devices.

An exemplary process for implementing a mechanism for providing a prioritization recommendation for a set of tasks on a set of user devices by utilizing the network environment of FIG. 2 is shown as being executed in FIG. 3. Specifically, a first client device 208(1) and a second client device 208(2) are illustrated as being in communication with TP device 202. In this regard, the first client device 208(1) and the second client device 208(2) may be “clients” of the TP device 202 and are described herein as such. Nevertheless, it is to be known and understood that the first client device 208(1) and/or the second client device 208(2) need not necessarily be “clients” of the TP device 202, or any entity described in association therewith herein. Any additional or alternative relationship may exist between either or both of the first client device 208(1) and the second client device 208(2) and the TP device 202, or no relationship may exist.

Further, TP device 202 is illustrated as being able to access the one or more repositories 206(1) . . . 206(*n*). The TP module 302 may be configured to access these databases for implementing the method of providing a prioritization recommendation for a set of tasks on a set of user devices.

The first client device 208(1) may be, for example, a smartphone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both the first client device 208(1) and the second client device 208(2) may communicate with the TP device 202 via broadband or cellular communication. Of course, these embodiments are merely exemplary and are not limiting or exhaustive.

Figure 4:
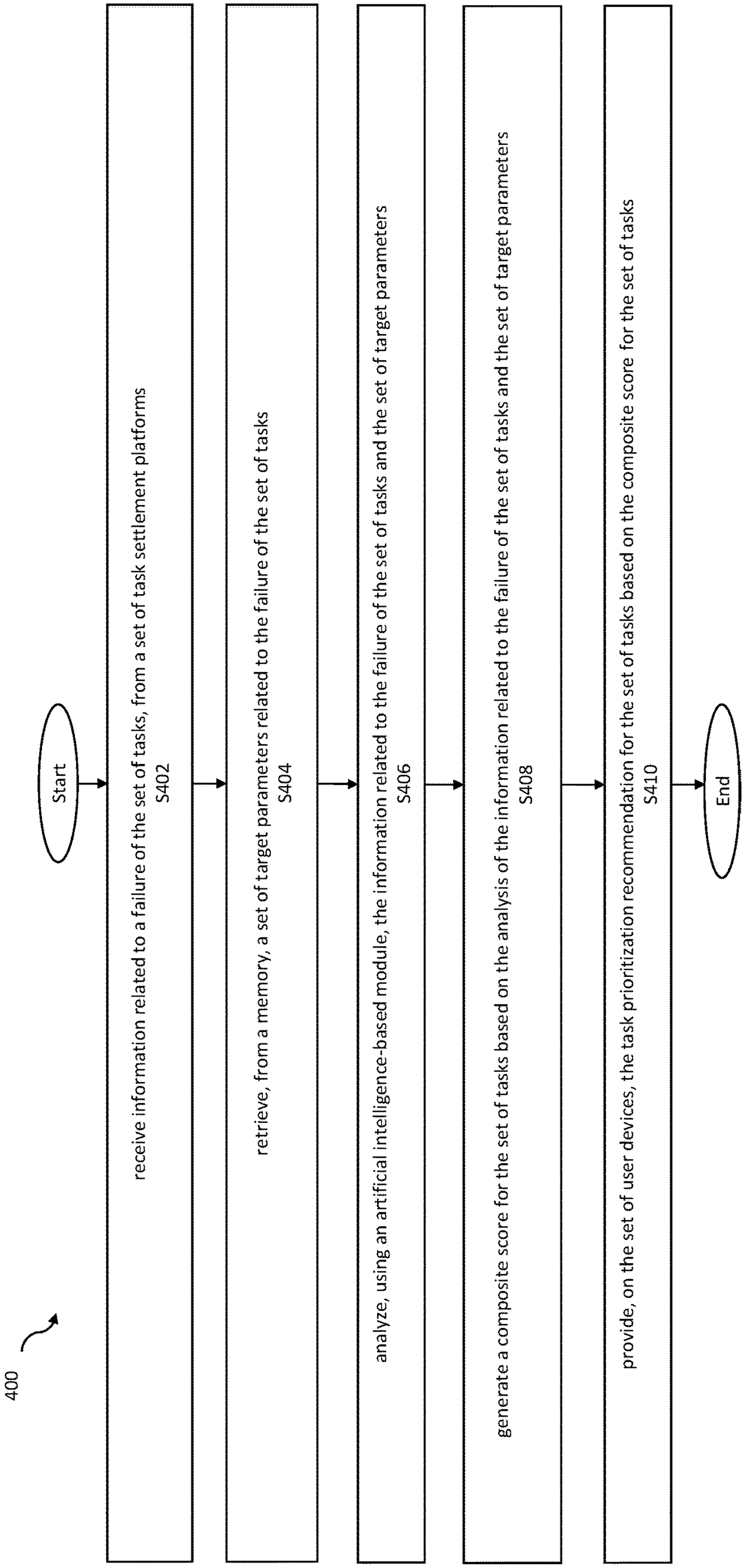
FIG. 4 illustrates an exemplary method flow diagram for providing a prioritization recommendation for a set of tasks on a set of user devices, in accordance with an exemplary embodiment.

Referring to FIG. 4, an exemplary method flow diagram depicting a method 400 for providing a prioritization recommendation for a set of tasks on a set of user devices, in accordance with an exemplary embodiment, is shown.

In the method 400 of FIG. 4, at step S402, the method includes receiving, by the processor 104 via a communication interface, information related to a failure of the set of tasks, from a set of task settlement platforms. In a preferred implementation of the present disclosure, at least one task from among the set of tasks is a trade settlement task, however the present disclosure is not limited thereto, and the features of the present disclosure may be implemented for such any other task(s) that may be obvious to a person skilled in the art in light of the present disclosure. Also, the set of task settlement platforms may include digital platform (s) (for e.g., digital application(s) or digital website(s) or a combination thereof) on which the set of tasks are executed.

The information related to the failure of the set of tasks includes at least one from among a value associated with the failure of the set of tasks and a flag associated with the failure of the set of tasks. Particularly, the information related to the failure of the set of tasks includes at least one from among: a first risk detail related to the value associated with the failure of the set of tasks, a first urgency detail related to the value associated with the failure of the set of tasks, a first complexity detail related to the value associated with the failure of the set of tasks, a first cost detail related to the value associated with the failure of the set of tasks, a second risk detail related to the flag associated with the failure of the set of tasks, a second urgency detail related to the flag associated with the failure of the set of tasks, a second complexity detail related to the flag associated with the failure of the set of tasks, and a second cost detail related to the flag associated with the failure of the set of tasks, however the present disclosure is not limited thereto.

At step S404, the method includes retrieving, by the processor 104 from a memory 106, a set of target parameters related to the failure of the set of tasks. Also, the set of target parameters related to the failure of the set of tasks is identified from a set of pre-defined parameters based on the set of market conditions. The set of pre-defined parameters includes at least one from among manually defined parameters and automatically defined parameters related to a plurality of tasks that may be executed on the set of task settlement platforms. The set of market conditions includes data related to market parameter(s) such as liquidity, exposure, regulation penalties etc. In the preferred implementation of the present disclosure, the set of pre-defined parameters may, for example, include at least one from among an exposure parameter, an age parameter, a regulatory amount parameter, a regulation charge, a security lending parameter, a pre-matching parameter, and an affirmed flag parameter, however the present disclosure is not limited thereto.

At step S406, the method includes analyzing, by the processor 104 using an artificial intelligence-based module, the information related to the failure of the set of tasks and the set of target parameters. Particularly, the step of the analyzing, by the processor 104 using the artificial intelligence-based module, the information related to the failure of the set of tasks and the set of target parameters includes: 1) assigning a respective weight to each respective target parameter included in the set of target parameters based on at least one among the set of market conditions and the information related to the failure of the set of tasks, 2) assigning a respective priority value to said each respective target parameter included in the set of target parameters based on the respective weight assigned to said each respective target parameter included in the set of target parameters, and 3) determining a respective score factor for said each respective target parameter included in the set of target parameters based on the respective priority value of said each respective target parameter included in the set of target parameters. Furthermore, in the method 400 the step of the generating, by the processor 104, the composite score for the set of tasks includes generating the composite score for the set of tasks based on the respective score factor for said each respective target parameter included in the set of target parameters.

After analyzing, by the processor 104 using the artificial intelligence-based module, the information related to the failure of the set of tasks and the set of target parameters, the processor 104 further analyzes the information related to the failure of the set of tasks and the set of target parameters based on a manual input. This further provides reduction in errors and technical advancement over the exiting solutions in terms of analysis of data points in enhanced and efficient manner. Furthermore, Table 1 as shown below depicts exemplary: target parameters related to a failure of a set of tasks, information related to the failure of the set of tasks, priority value assigned to the target parameters, and a score factor determined for the target parameters:

TABLE 1

| Target Parameters related to a failure of a set of tasks | Information related to the set of tasks | Priority value determined for the target parameters | Score factor determined for the target parameters |
|---|---|---|---|
| Parameter 1 | Bigger number (value) - > More risky | 1 | 1 |
| Parameter 2 | Bigger number -> More urgent | 2 | 0.95 |
| Parameter 3 | Lower number -> More urgent | 3 | 0.9 |
| Parameter 4 | Lower number -> More urgent | 3 | 0.9 |
| Parameter 5 | If Yes (flag) -> More urgent | 4 | 0.8 |
| Parameter 6 | If Yes (flag) -> More urgent | 4 | 0.8 |
| Parameter 7 | If Yes (flag) -> Less urgent | 4 | 0.8 |
| Parameter 8 | If Yes (flag) -> Less urgent | 4 | 0.8 |

Next, at step S408, the method includes generating, by the processor 104, a composite score for the set of tasks based on the analysis of the information related to the failure of the set of tasks and the set of target parameters. This is further explained with respect to an implementation where the generation of the composite score in reference to the details as provided in the Table 1 may include the following steps:

Step 1—Collection of the target parameters related to the set of tasks, and the information related to the failure of the set of tasks.

Step 2—Sorting the collected target parameters based on the information related to the failure of the set of tasks in accordance with the implementation of features of the present disclosure. For example—for a larger number having a greater risk, sorting may be done in an ascending order and for a larger number having less risk, sorting may be done in a descending order. The Table 1 as provided above depicts the sorted target parameters.

Step 3—Determining a ranking score for each record based on the sorting and multiplying the ranking score with corresponding score factor. For example, if a ranking score of a parameter is 10 and a score factor for said parameter is 0.8, in such case multiplied value is 8.

Step 4—Once the multiplied values for all the target parameters are determined, such values are then used for determining the composite score. For example, the composite score in reference to the Table 1 is determined as below:

Composite score=[score (or for e.g., referred above as "multiplied value") of Parameter 1+score of Parameter 2+score of Parameter 3+score of Parameter 4]*[score of Parameter 5+score of Parameter 6+score of Parameter 7+score of Parameter 8]

Therefore, the composite score is a single index which has multiple underlying components directly linked with risk and cost. The composite score eliminates biases in prioritization and provides a single benchmark to assess factors such as cost, and criticality of failure related to task(s). Also, the weights used in scoring may be adjusted as per certain conditions (for example, in the preferred implementation of the present disclosure as per market conditions), so the composite score is not dependent on any single factor but is dynamic. Also, it is pertinent to note that the determination of the composite score in reference to the Table 1 is non-limiting, and any other method that may be apparent to a person skilled in the art in light of the disclosure of the present disclosure may be implemented for this purpose. For example, in an implementation, at least one from among a group, a region and a load specific logic may be considered to determine the composite score.

Next, at step S410, the method includes providing, by the processor 104 on the set of user devices, the task prioritization recommendation for the set of tasks based on the composite score for the set of tasks. For example, say if a composite score of a task A is higher than a composite score of a task B, then a prioritization recommendation for the task A and task B is generated by the processor 104 and then provided on user device(s) by the processor 104, wherein such prioritization recommendation for the task A indicates higher priority for the task A as compared to the task B.

The method further includes receiving, by the processor 104 at least one among: a set of feedback data from the set of user devices based on the prioritization recommendation provided on the set of user devices for the set of tasks, and a set of additional target parameters related to the failure of the set of tasks based on the set of market conditions. The set of additional target parameters includes one or more new parameters that are related to the failure of the set of tasks in addition to the set of target parameters related to the failure of the set of tasks. In the preferred implementation, the set of additional target parameters are identified from the set of pre-defined parameters based on the set of market conditions. Also, the method thereafter includes updating, by the processor 104 the artificial intelligence-based module based on at least one among the feedback data and the set of additional target parameters. Further, the method includes reanalyzing, by the processor 104, the information related to the failure of the set of tasks and the set of target parameters, using the updated artificial intelligence-based module, to generate an updated composite score for the set of tasks. Thereafter, the method includes providing, by the processor 104 on the set of user devices, an updated version of the task prioritization recommendation for the set of tasks based on the updated composite score for the set of tasks.

Moreover, in an implementation, the present disclosure encompasses classifying at least one from among the set of tasks into a category based on a corresponding composite score of the set of tasks. For example, a task with a corresponding higher composite score may be categorized into a red color category, a task with a corresponding medium composite score may be categorized into a yellow color category, and a task with a corresponding lower composite score may be categorized into a green color category.

Therefore, the present disclosure provides a technical solution that provides a prioritization recommendation for a set of tasks on a set of user devices. Also, the present disclosure provides the technical solution that overcomes the limitations of the existing solutions such as including but is not limited to requirements of human resources at a large scale and manual errors while handling various tasks simultaneously. Moreover, the technical solution as disclosed in the present disclosure provides technical effect and technical advantage over the existing solutions as the technical solution encompasses: 1) generating a composite score that ranks task failures, and used to generate and provide prioritization recommendation(s) on user device(s) to guide users of the user device(s) in prioritizing important tasks, 2) generating an improved composite score based on a feedback data and additional parameters related to task failure(s), 3) generating a composite score as a single index score having multiple underlying components directly linked with risk and cost associated with task failure(s), 4) handling task fails related to important tasks e.g., tasks having at least one among a large monetary impact and a large risk impact than others, and 5) handling task fails in more enhanced manner, thus improving the key performance indicators (KPIs), etc.

Furthermore, an aspect of the present disclosure relates to a non-transitory computer readable storage medium storing instructions for providing a prioritization recommendation for a set of tasks on a set of user devices. The instructions include executable code which, when executed by a processor, may cause the processor to: receive, via a communication interface, information related to a failure of the set of tasks, from a set of task settlement platforms; retrieve, from the memory, a set of target parameters related to the failure of the set of tasks; analyze, using an artificial intelligence-based module, the information related to the failure of the set of tasks and the set of target parameters; generate a composite score for the set of tasks based on the analysis of the information related to the failure of the set of tasks and the set of target parameters; and provide, on the set of user devices, the task prioritization recommendation for the set of tasks based on the composite score for the set of tasks.

In accordance with an exemplary embodiment, the information related to the failure of the set of tasks may include at least one among a first risk detail related to a value associated with the failure of the set of tasks, a first urgency detail related to the value associated with the failure of the set of tasks, a first complexity detail related to the value associated with the failure of the set of tasks, a first cost detail related to the value associated with the failure of the set of tasks, a second risk detail related to a flag associated with the failure of the set of tasks, a second urgency detail related to the flag associated with the failure of the set of tasks, a second complexity detail related to the flag associated with the failure of the set of tasks, and a second cost detail related to the flag associated with the failure of the set of tasks.

In accordance with an exemplary embodiment, when executed by the processor, the executable code may further cause the processor to analyze the information related to the failure of the set of tasks and the set of target parameters based on a manual input.

In accordance with an exemplary embodiment, to analyze using the artificial intelligence-based module, the information related to the failure of the set of tasks and the set of target parameters, when executed by the processor, the executable code may further cause the processor to: assign a respective weight to each respective target parameter from the set of target parameters based on at least one among a set of market conditions and the information related to the failure of the set of tasks; assign a respective priority value to said each respective target parameter from the set of target parameters based on the respective weight assigned to said each respective target parameter from the set of target parameters; and determine a respective score factor for said each respective target parameter from the set of target parameters based on the respective priority value of said each respective target parameter from the set of target parameters.

In accordance with an exemplary embodiment, when executed by the processor, the executable code may further cause the processor to generate the composite score for the set of tasks based on the respective score factor for said each respective target parameter from the set of target parameters.

In accordance with an exemplary embodiment, at least one task from among the set of tasks is a trade settlement task, and the set of target parameters related to the failure of the set of tasks is identified from a set of pre-defined parameters based on the set of market conditions.

In accordance with an exemplary embodiment, when executed by the processor, the executable code may further cause the processor to: receive at least one from among: a set of feedback data from the set of user devices based on the prioritization recommendation provided on the set of user devices for the set of tasks, and a set of additional target parameters based on the set of market conditions; update the artificial intelligence-based module based on at least one from among the set of feedback data and the set of additional target parameters; reanalyze the information related to the failure of the set of tasks and the set of target parameters, using the updated artificial intelligence-based module, to generate an updated composite score for the set of tasks; and provide, on the set of user devices, an updated version of the task prioritization recommendation for the set of tasks based on the updated composite score for the set of tasks.

Therefore, the present disclosure provides a technical solution for providing the prioritization recommendation for the set of tasks on the set of user devices, which overcomes limitations of the existing solutions such as including but is not limited to the limitations of the known arts as described in the present disclosure.

Although the present disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the present disclosure has been described with reference to particular means, materials, and embodiments, the present disclosure is not intended to be limited to the particulars disclosed; rather the present disclosure extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The terms "computer-readable medium" and/or "computer-readable storage medium" shall also include any storage medium that is capable of storing, encoding, or carrying a set of instructions for execution by a processor or that causes a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the present disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application-specific integrated circuits, programmable logic arrays, and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the present disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the present disclosure. Other embodiments may be utilized and derived from the present disclosure, such that structural and logical substitutions and changes may be made without departing from the scope of the present disclosure. Additionally, the illustrations are merely representational and may not be drawn to scale. Certain proportions within the illustrations may be exaggerated, while other proportions may be minimized. Accordingly, the present disclosure and the figures are to be regarded as illustrative rather than restrictive.

One or more embodiments of the present disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the present disclosure is submitted with the understanding that it will not be used to interpret or limit the scope or meaning of the claims. In addition, in the foregoing Detailed Description, various features may be grouped together or described in a single embodiment for the purpose of streamlining the present disclosure. This disclosure is not to be interpreted as reflecting an intention that the claimed embodiments require more features than are expressly recited in each claim. Rather, as the following claims reflect, the inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing a task prioritization recommendation for a set of tasks on a set of user devices, the method being implemented by at least one processor, the method comprising:

receiving, by the at least one processor via a communication interface, first information related to a failure of the set of tasks, from a set of task settlement platforms;

retrieving, by the at least one processor from a memory, a set of target parameters related to the failure of the set of tasks;

analyzing, by the at least one processor using an artificial intelligence-based module, the first information related to the failure of the set of tasks and the set of target parameters;

generating, by the at least one processor, a composite score for the set of tasks based on the analysis of the first information related to the failure of the set of tasks and the set of target parameters; and providing, by the at least one processor on the set of user devices, the task prioritization recommendation for the set of tasks based on the composite score for the set of tasks, wherein the analyzing of the first information related to the failure of the set of tasks and the set of target parameters comprises:

assigning a respective weight to each respective target parameter included in the set of target parameters based on at least one from among a set of market conditions and the first information related to the failure of the set of tasks, assigning a respective priority value to said each respective target parameter included in the set of target parameters based on the respective weight assigned to said each respective target parameter included in the set of target parameters, and determining a respective score factor for said each respective target parameter included in the set of target parameters based on the respective priority value of said each respective target parameter included in the set of target parameters.

2. The method as claimed in claim 1, wherein the first information related to the failure of the set of tasks and the set of target parameters are further analyzed by the at least one processor based on a manual input, and the first information related to the failure of the set of tasks comprises at least one from among:

a first risk detail related to a value associated with the failure of the set of tasks, a first urgency detail related to the value associated with the failure of the set of tasks, a first complexity detail related to the value associated with the failure of the set of tasks, a first cost detail related to the value associated with the failure of the set of tasks, a second risk detail related to a flag associated with the failure of the set of tasks, a second urgency detail related to the flag associated with the failure of the set of tasks, a second complexity detail related to the flag associated with the failure of the set of tasks, and a second cost detail related to the flag associated with the failure of the set of tasks.

3. The method as claimed in claim 1, wherein the generating of the composite score for the set of tasks comprises generating the composite score for the set of tasks based on the respective score factor for said each respective target parameter included in the set of target parameters.

4. The method as claimed in claim 1, wherein at least one task from among the set of tasks is a trade settlement task and wherein the set of target parameters related to the failure of the set of tasks is identified from a set of pre-defined parameters based on the set of market conditions.

5. The method as claimed in claim 3, the method further comprising:

receiving, by the at least one processor, at least one from among a set of feedback data from the set of user devices based on the task prioritization recommendation provided on the set of user devices for the set of tasks, and a set of additional target parameters based on the set of market conditions, updating, by the at least one processor, the artificial intelligence-based module based on at least one from among the set of feedback data and the set of additional target parameters, reanalyzing, by the at least one processor, the first information related to the failure of the set of tasks and the set of target parameters, using the updated artificial intelligence-based module, to generate an updated composite score for the set of tasks, and providing, by the at least one processor on the set of user devices, an updated version of the task prioritization recommendation for the set of tasks based on the updated composite score for the set of tasks.

6. A computing device for providing a task prioritization recommendation for a set of tasks on a set of user devices, the computing device comprising:

a processor;

a memory; and a communication interface coupled to each of the processor and the memory, wherein the processor is configured to:

receive, via the communication interface, first information related to a failure of the set of tasks, from a set of task settlement platforms, retrieve, from the memory, a set of target parameters related to the failure of the set of tasks, analyze, using an artificial intelligence-based module, the first information related to the failure of the set of tasks and the set of target parameters, generate a composite score for the set of tasks based on the analysis of the first information related to the failure of the set of tasks and the set of target parameters, and provide, on the set of user devices, the task prioritization recommendation for the set of tasks based on the composite score for the set of tasks, wherein to analyze the first information related to the failure of the set of tasks and the set of target parameters, the processor is further configured to:

assign a respective weight to each respective target parameter included in the set of target parameters based on at least one from among a set of market conditions and the first information related to the failure of the set of tasks, assign a respective priority value to said each respective target parameter included in the set of target parameters based on the respective weight assigned to said each respective target parameter included in the set of target parameters, and determine a respective score factor for said each respective target parameter included in the set of target parameters based on the respective priority value of said each respective target parameter included in the set of target parameters.

7. The computing device as claimed in claim 6, wherein the first information related to the failure of the set of tasks and the set of target parameters are further analyzed by the processor based on a manual input, and the first information related to the failure of the set of tasks comprises at least one from among:

a first risk detail related to a value associated with the failure of the set of tasks, a first urgency detail related to the value associated with the failure of the set of tasks, a first complexity detail related to the value associated with the failure of the set of tasks, a first cost detail related to the value associated with the failure of the set of tasks, a second risk detail related to a flag associated with the failure of the set of tasks, a second urgency detail related to the flag associated with the failure of the set of tasks, a second complexity detail related to the flag associated with the failure of the set of tasks, and a second cost detail related to the flag associated with the failure of the set of tasks.

8. The computing device as claimed in claim 6, wherein the processor is further configured to generate the composite score for the set of tasks based on the respective score factor for said each respective target parameter included in the set of target parameters.

9. The computing device as claimed in claim 6, wherein at least one task from among the set of tasks is a trade settlement task and wherein the set of target parameters related to the failure of the set of tasks is identified from a set of pre-defined parameters based on the set of market conditions.

10. The computing device as claimed in claim 8, wherein the processor is further configured to:

receive at least one from among a set of feedback data from the set of user devices based on the task prioritization recommendation provided on the set of user devices for the set of tasks, and a set of additional target parameters based on the set of market conditions, update the artificial intelligence-based module based on at least one from among the set of feedback data and the set of additional target parameters, reanalyze the first information related to the failure of the set of tasks and the set of target parameters, using the updated artificial intelligence-based module, to generate an updated composite score for the set of tasks, and provide, on the set of user devices, an updated version of the task prioritization recommendation for the set of tasks based on the updated composite score for the set of tasks.

11. A non-transitory computer readable storage medium storing instructions for providing a task prioritization recommendation for a set of tasks on a set of user devices, the storage medium comprising executable code which, when executed by a processor, causes the processor to:

receive, via a communication interface, first information related to a failure of the set of tasks, from a set of task settlement platforms;

retrieve, from a memory, a set of target parameters related to the failure of the set of tasks;

analyze, using an artificial intelligence-based module, the first information related to the failure of the set of tasks and the set of target parameters;

generate a composite score for the set of tasks based on the analysis of the first information related to the failure of the set of tasks and the set of target parameters; and provide, on the set of user devices, the task prioritization recommendation for the set of tasks based on the composite score for the set of tasks, wherein to analyze the first information related to the failure of the set of tasks and the set of target parameters when executed by the processor, the executable code further causes the processor to:

assign a respective weight to each respective target parameter included in the set of target parameters based on at least one from among a set of market conditions and the first information related to the failure of the set of tasks, assign a respective priority value to said each respective target parameter included in the set of target parameters based on the respective weight assigned to said each respective target parameter included in the set of target parameters, and determine a respective score factor for said each respective target parameter included in the set of target parameters based on the respective priority value of said each respective target parameter included in the set of target parameters.

12. The storage medium as claimed in claim 11, wherein when executed by the processor, the executable code further causes the processor to analyze the first information related to the failure of the set of tasks and the set of target parameters based on a manual input, and the first information related to the failure of the set of tasks comprises at least one from among:

a first risk detail related to a value associated with the failure of the set of tasks, a first urgency detail related to the value associated with the failure of the set of tasks, a first complexity detail related to the value associated with the failure of the set of tasks, a first cost detail related to the value associated with the failure of the set of tasks, a second risk detail related to a flag associated with the failure of the set of tasks, a second urgency detail related to the flag associated with the failure of the set of tasks, a second complexity detail related to the flag associated with the failure of the set of tasks, and a second cost detail related to the flag associated with the failure of the set of tasks.

13. The storage medium as claimed in claim 11, wherein when executed by the processor, the executable code further causes the processor to generate the composite score for the set of tasks based on the respective score factor for said each respective target parameter included in the set of target parameters.

14. The storage medium as claimed in claim 11, wherein at least one task from among the set of tasks is a trade settlement task and wherein the set of target parameters related to the failure of the set of tasks is identified from a set of pre-defined parameters based on the set of market conditions.

15. The storage medium as claimed in claim 13, wherein when executed by the processor, the executable code further causes the processor to:

receive at least one from among a set of feedback data from the set of user devices based on the task prioritization recommendation provided on the set of user devices for the set of tasks, and a set of additional target parameters based on the set of market conditions, update the artificial intelligence-based module based on at least one from among the set of feedback data and the set of additional target parameters, reanalyze the first information related to the failure of the set of tasks and the set of target parameters, using the updated artificial intelligence-based module, to generate an updated composite score for the set of tasks, and provide, on the set of user devices, an updated version of the task prioritization recommendation for the set of tasks based on the updated composite score for the set of tasks.

* * * * *